Nov. 16, 1965   D. A. RICHARDSON ETAL   3,218,027
HYDRAULIC VALVE CONTROL

Filed Aug. 26, 1963   8 Sheets-Sheet 1

INVENTORS
DAVID A. RICHARDSON
& HANS G. KRAUSS
BY Robert J. McDonnell
Franklin J. Visek
THEIR ATTORNEYS Nov. 16, 1965  D. A. RICHARDSON ETAL  3,218,027
HYDRAULIC VALVE CONTROL Filed Aug. 26, 1963

INVENTORS
DAVID A. RICHARDSON
& HANS G. KRAUSS
BY Robert J. McDonnell
Franklin J. Vieck
THEIR ATTORNEYS

INVENTORS
DAVID A. RICHARDSON
& HANS G. KRAUSS

BY Robert J. McDonnell
Franklin J. Visek
THEIR ATTORNEYS

Nov. 16, 1965  D. A. RICHARDSON ETAL  3,218,027
HYDRAULIC VALVE CONTROL

Filed Aug. 26, 1963  8 Sheets-Sheet 5

INVENTORS
DAVID A. RICHARDSON
& HANS G. KRAUSS

BY  Robert J. McDonnell
    Franklin J. Visek

THEIR ATTORNEYS

FIG.11
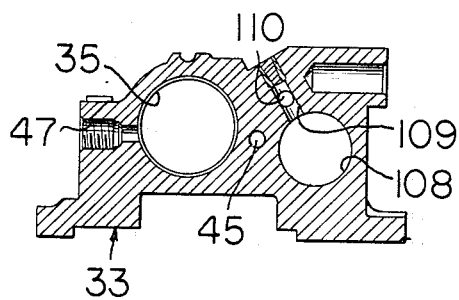
FIG.12
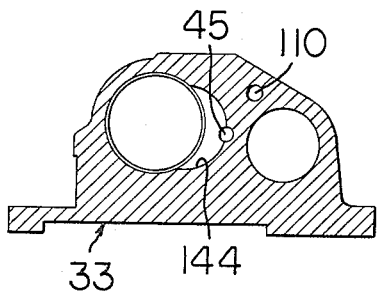
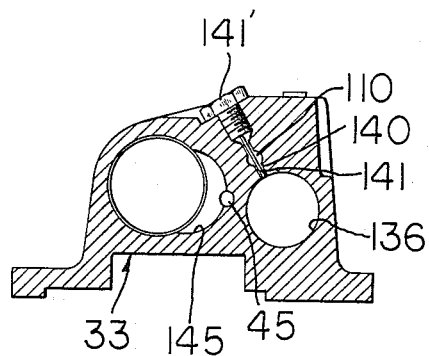
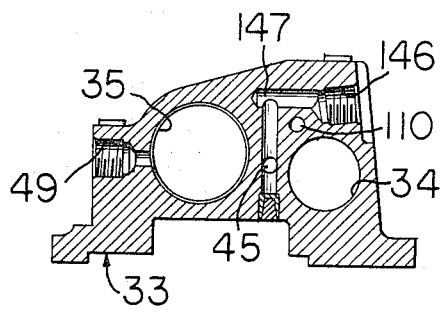
FIG.13
FIG.14

Nov. 16, 1965    D. A. RICHARDSON ETAL    3,218,027
HYDRAULIC VALVE CONTROL
Filed Aug. 26, 1963    8 Sheets-Sheet 7

INVENTORS
DAVID A. RICHARDSON
& HANS G. KRAUSS
BY Robert J. McDonnell
Franklin J. Vick
THEIR ATTORNEYS

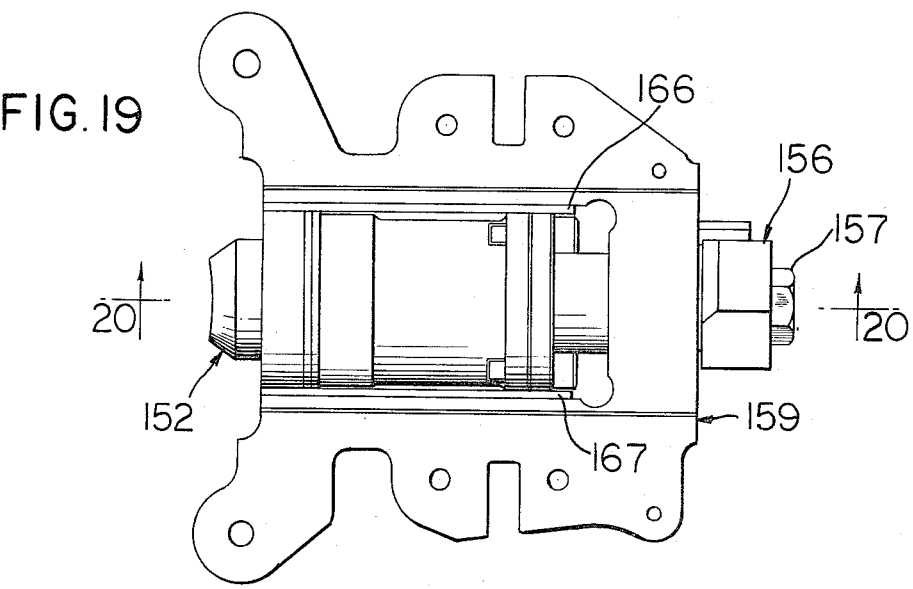
FIG. 19
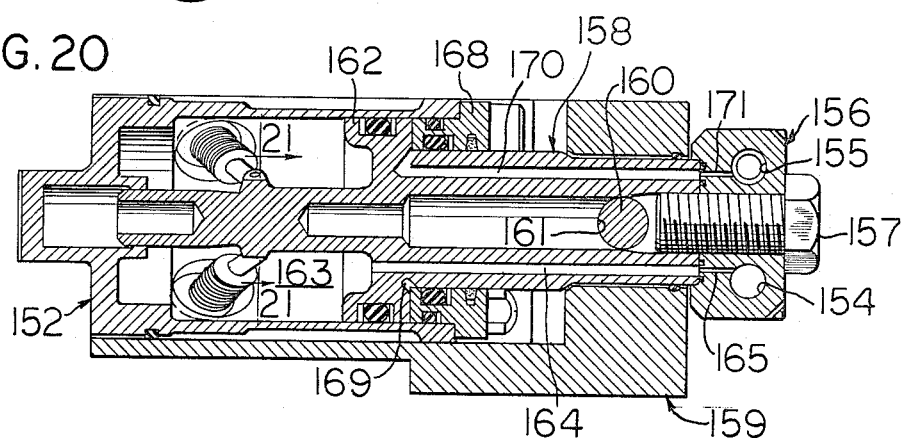
FIG. 20
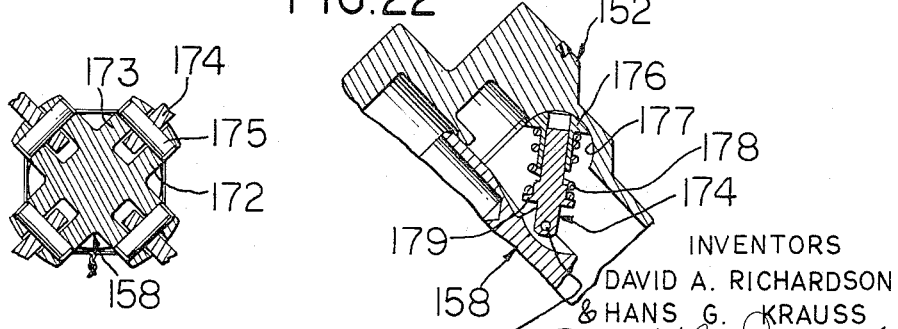
FIG. 22
FIG. 21
INVENTORS
DAVID A. RICHARDSON
& HANS G. KRAUSS
Robert J. McDonnell
BY Franklin J. Vick
THEIR ATTORNEYS United States Patent Office 3,218,027
Patented Nov. 16, 1965

3,218,027
HYDRAULIC VALVE CONTROL
David A. Richardson, Wayne, and Hans G. Krauss, Broomall, Pa., assignors to The Boeing Company, Seattle, Wash., a corporation of Delaware
Filed Aug. 26, 1963, Ser. No. 304,520
21 Claims. (Cl. 253—1)

This invention relates to a hydraulic valve control and, more particularly, to a hydraulic valve control for determining the position of a movable member with respect to a predetermined position and controlling the fluid flow through the valve so that the member is returned to the predetermined position.

In helicopters, it is desirable to fold the rotor blades as this permits the helicopter to be stored in a much smaller area. In order to fold the blades as rapidly as possible, an automatic actuating mechanism is preferably employed. However, any type of automatic blade folding apparatus must begin folding of the rotor blades from a specified position of the rotor blades with respect to the helicopter. Accordingly, the rotor shaft, which drives the blades, must be capable of being moved to a specified predetermined postion from which the rotor blades will be folded.

Whenever a rotor shaft is stopped, the position of the rotor shaft with respect to the predetermined position, which is where folding of the rotor blades will begin, may be any degree of rotation. While the rotor shaft rotates the rotor blades in only one direction, it is seen that the rotation of the rotor shaft in only one direction to reach its predetermined position would result in a lengthy period of time being required if the shaft were almost at its predetermined position but had to be rotated in the opposite direction (that is about 359 degrees, for example) in order to reach the predetermined position. Since the blades are subjected to wind forces when the rotor shaft is being rotated to the predetermined position, it is desirable to reduce the amount of rotation necessary for the shaft to reach its predetermined position. If the helicopter is used on an aircraft carrier, for example, a long period of time to rotate the shaft to its predetermined position results in lengthy time periods before the helicopter can be stored below the flight deck by being transported on an elevator.

The present invention satisfactorily solves these problems by providing a hydraulic valve control that will sense the position of the rotor shaft with respect to its predetermined position and moves it in a predetermined direction so that the amount of necessary movement is reduced. That is, the shaft rotates in either of two directions depending upon the position of the shaft with respect to its predetermined position. The hydraulic valve control senses the position of the shaft and then controls the supply of fluid to the driving means for the rotating shaft.

An object of this invention is to provide a hydraulic control for determining the direction of movement of a member from any position to a predetermined position.

Another object of this invention is to provide a mechanism for sensing the position of a rotor shaft, which drives the rotor blades of a helicopter, to determine the required direction of rotation of the shaft to move it to its blade folding position and for rotating the shaft to its blade folding position.

A further object of this invention is to provide a device for maintaining the rotor shaft of a helicopter in its blade folding position during folding and unfolding of the blade.

An additional object of this invention is to position a rotor shaft of a helicopter in the shortest possible time for blade folding.

A further additional object of this invention is to provide a mechanism for blade folding which insures a minimum amount of time for the folding operation.

Still another object of the invention is to provide automatic blade folding with a minimum amount of blade rotation to position the blades.

A still further object is to sense a pre-fold position of a rotor shaft in order to determine the direction in which the shaft should be rotated.

Yet another object of the invention is to provide a positioning mechanism for blade folding operations that senses the position of the blade by determining the position of the rotor through cams on the rotor shaft extension, utilizing this input to ascertain the required direction of rotation to position the blades, and then locking the blades in the blade folding position.

Still another object of the invention is to provide an automatic blade positioning mechanism for folding rotor blades in which the mechanism includes a locking feature to insure that the blades cannot be moved again, after they are positioned, until a positive signal is received.

Other objects of this invention will be readily perceived from the following description, claims, and drawings.

This invention relates to a hydraulic mechanism for moving a member to a predetermined position. The mechanism includes means to sense the position of the member with respect to its predetermined position. The sensing means determines the direction of movement of the member to its predetermined position.

This invention also relates to a hydraulic mechanism adapted to control the movement of a member to a predetermined position in a predetermined direction. The mechanism includes a housing having a fluid supply port, a fluid return port, and a pair of control ports adapted to be conncetyd to a motor or the like for moving the member to its predetermined position. The housing has control means axially movable therethrough. Fluid is supplied to the supply port by suitable means to move the control means axially in one direction through the housing to a first position or a second position in accordance with the position of the member with respect to its predetermined position. The control means permits fluid flow from the supply port to one of the control ports and from the other of the control ports to the return port when in its first position whereby the motor moves the member in one direction to its predetermined position. The control means permits fluid flow from the supply port to the other control port and from the one control port to the return port in its second position whereby the motor moves the member in the opposite direction to its predetermined position.

This invention further relates to the combination of a rotatable shaft for driving rotor blades of a helicopter and means for rotating the shaft to a predetermined position. The combination includes a housing having a valve spool disposed therein for axial movement therein. The spool moves axially through the housing in one direction whenever fluid is applied to the spool. The rotatable shaft has a cam thereon against which the spool abuts when fluid is applied to the spool. The spool is stopped in its axial movement in a first position when abutting against a first portion of the cam. The spool progresses past its first position to a second position when the spool abuts against a second portion of the cam. The valve spool controls the direction of fluid flow to the rotating means whereby the rotating means drives the shaft in one direction when the valve spool is in its first position and in the opposite direction when the valve spool is in its second position.

The attached drawings illustrate a preferred embodiment of the invention, in which FIGURE 1 is a schematic of the hydraulic valve control of the present invention with the rotor shaft unlocked and the rotor blades in their normal flight condition;

FIGURE 11 is a sectional view of the housing and taken along the line 11—11 of FIGURE 5;

FIGURE 12 is a sectional view of the housing and taken along the line 12—12 of FIGURE 5;

FIGURE 13 is a sectional view of the housing and taken along the line 13—13 of FIGURE 5;

FIGURE 14 is a sectional view of the housing and taken along the line 14—14 of FIGURE 5;

FIGURE 19 is an elevational view of the locking mechanism of the present invention;

FIGURE 20 is a sectional view of the locking mechanism and taken along the line 20—20 of FIGURE 19;

FIGURE 21 is a sectional view of a portion of the locking mechanism and taken along the line 21—21 of FIGURE 20; and FIGURE 22 is a sectional view of a portion of the locking mechanism of FIGURE 20.

Figure 1A:
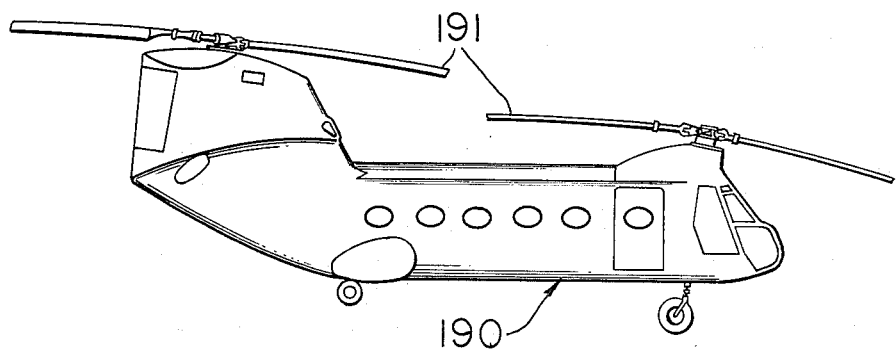
FIGURE 1A is a side elevation view of a helicopter utilizing the hydraulic valve control of the present invention.
Figure 1:
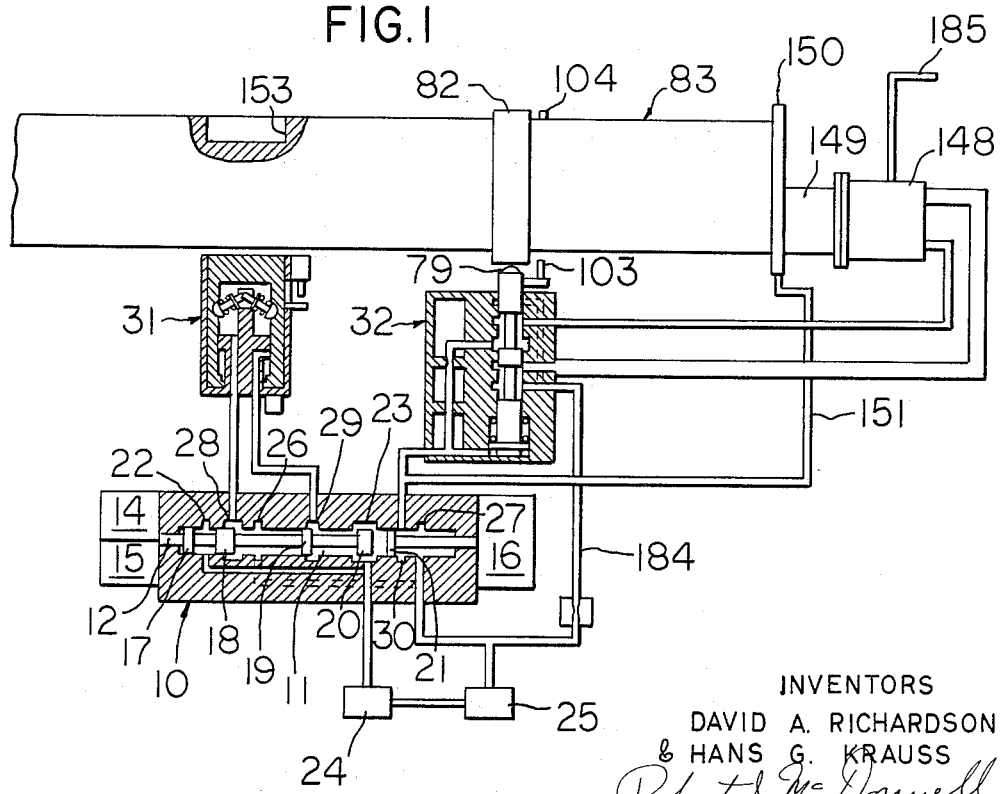
Figure 2:
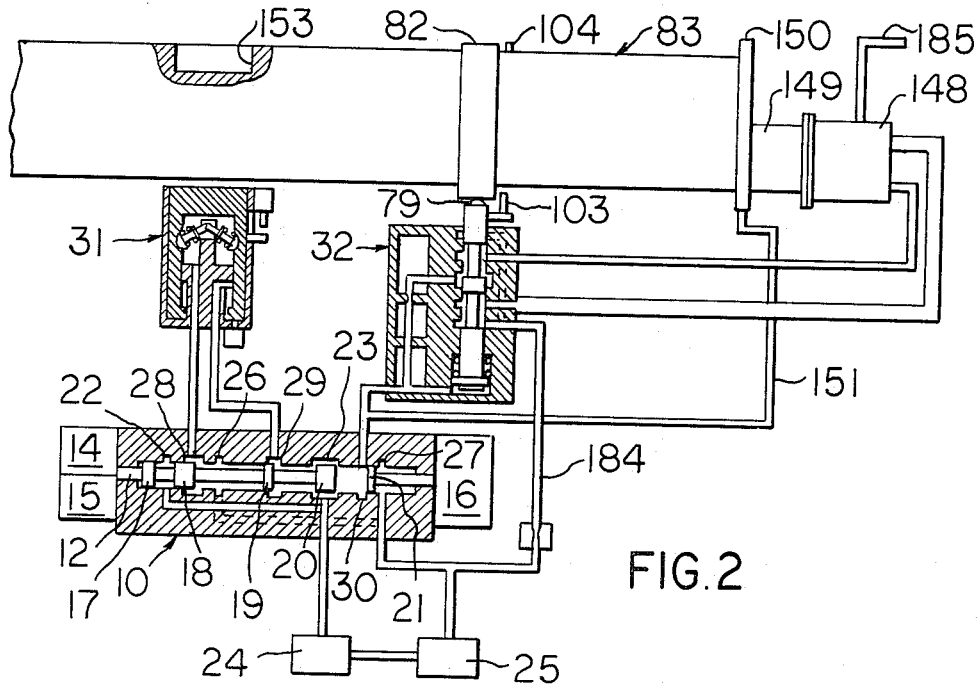
FIGURE 2 is a schematic similar to FIGURE 1 but with the valve control allowing the rotor shaft to be driven in one direction.
Figure 3:
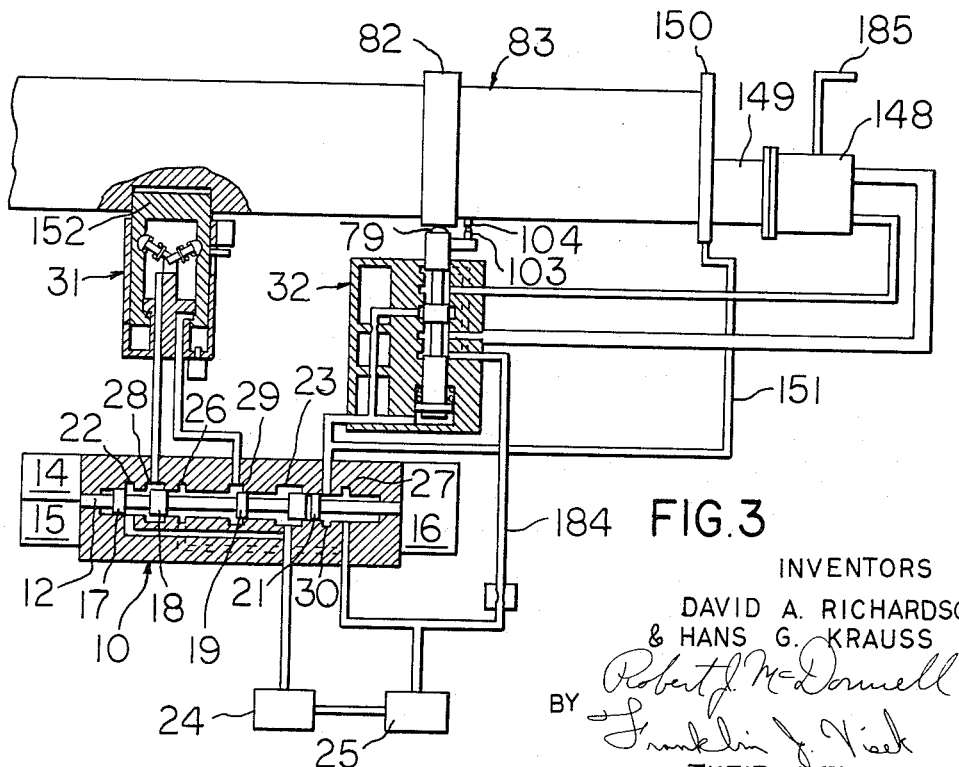
FIGURE 3 is a schematic similar to FIGURES 1 and 2 with the rotor shaft locked in its blade folding position.

Referring to the drawings and particularly FIGURES 1, 2, and 3, there is shown a control means including a housing 10 having a bore 11 extending therethrough. A spool 12 is disposed within the bore 11 and moved therein by solenoids 14 and 15. A valve 21, which is controlled by a solenoid 16, also is disposed within the bore 11. The solenoids 14 and 15 are disposed exteriorly of the housing 10 on one end thereof while the solenoid 16 is disposed exteriorly of the housing 10 on its other end.

The spool 12 has a plurality of lands 17, 18, 19, and 20 thereon. The lands 17–20 cooperate with some of the ports, which are formed around the bore 11 of the housing 10 by enlarging certain portions of the bore. The valve 21 cooperates with the remainder of the ports.

The housing 10 has two supply ports 22 and 23, which are connected to a pump 24 that furnishes fluid to the supply ports 22 and 23 from a hydraulic reservoir 25. The housing 10 also has two return ports 26 and 27, which are connected to the reservoir 25. Additionally, the housing 10 has three control ports 28, 29, and 30 with the ports 28 and 29 connected to a locking mechanism 31 and the port 30 connected to a rotor control mechanism 32.

When in the position shown in FIGURE 1, the lands 17–20 on the spool 12 are positioned with respect to the ports in the housing 10 so that the control port 28 is connected to the return port 26 while the control port 29 is connected to the supply port 23. At the same time, the valve 21 is positioned so that the control port 30 is connected to the return port 27.

Energization of the solenoid 16 causes the valve 21 to move to the right, as viewed in FIGURES 1–3, in the bore 11 so that the control port 30 is connected to the supply port 23 as shown in FIGURE 2. In this position, the control port 29 remains connected to the supply port 23 and the control port 28 still communicates with the return port 26. In this arrangement, the fluid flows from the pump 24 to the rotor control mechanism 32.

When the solenoid 14 is energized, the spool 12 is moved to the right, as viewed in FIGURES 1–3, to reposition the lands 17–20 with respect to the ports in the housing 10. In this position (see FIGURE 3), the control port 29 is now connected with the return port 26 and the control port 28 is now connected with the supply port 22. At the same time that the solenoid 14 is energized, the solenoid 16 is deenergized. The deenergization of the solenoid 16 causes the valve 21 to be moved from the position of FIGURE 2 to the position of FIGURE 3 whereby the control port 30 is again connected with the return port 27.

The spool 12 is returned to the position of FIGURE 1 from the position of FIGURE 3 by energizing the solenoid 15. It should be understood that the valve 21 does not move when the spool 12 is returned to the position of FIGURE 1 from the position of FIGURE 3.

Figure 4:
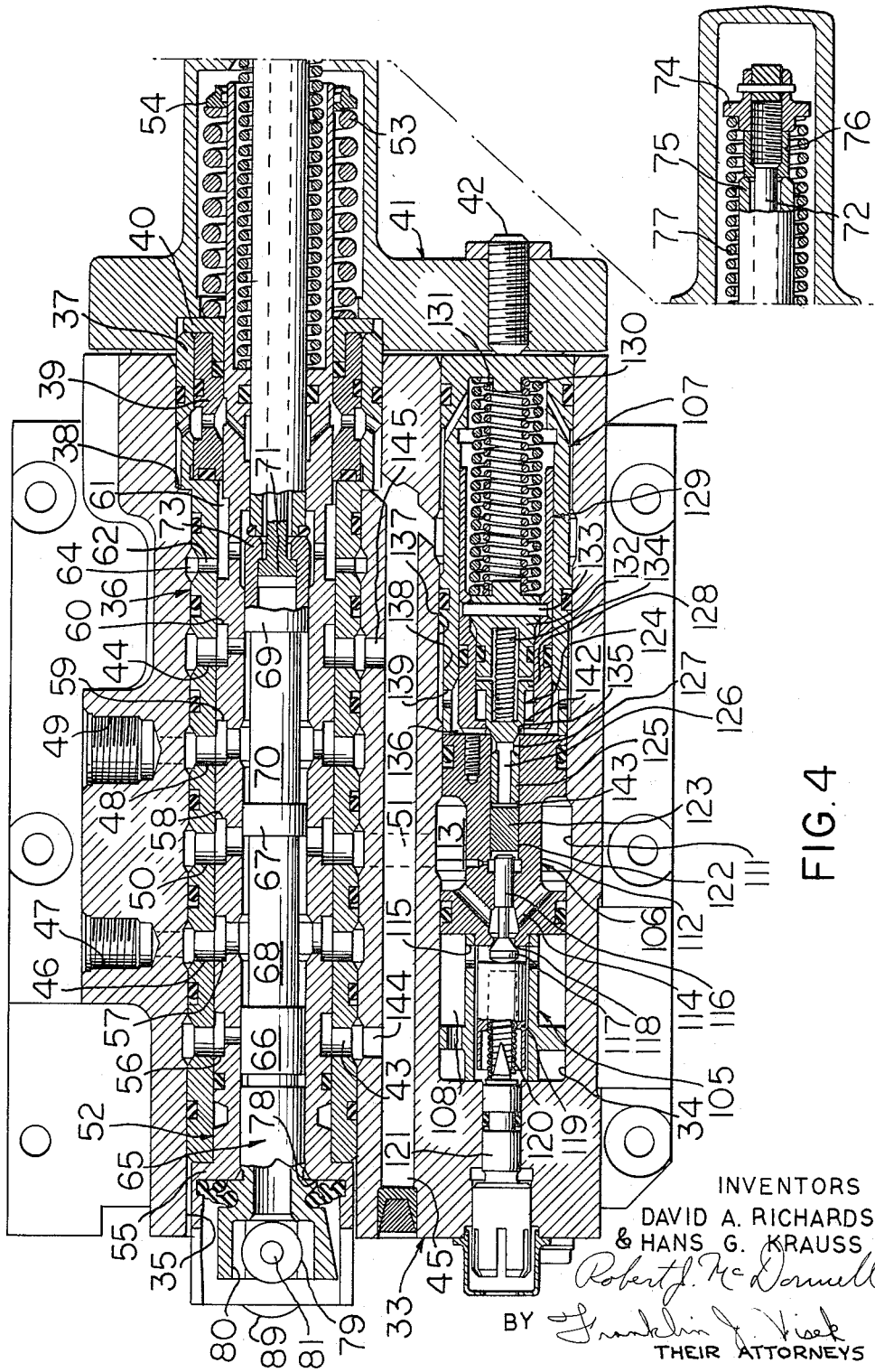
FIGURE 4 is a sectional view of the hydraulic valve control of the present invention.
Figure 5:
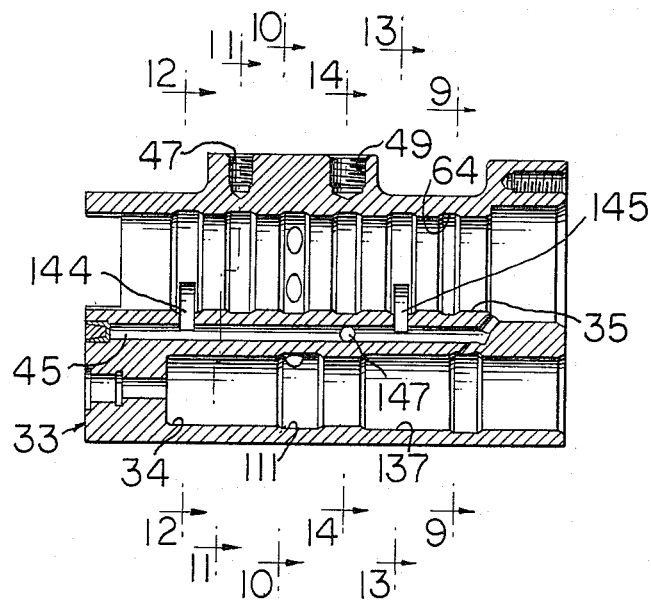
FIGURE 5 is a sectional view of the housing of the valve control of the present invention.

As shown in FIGURE 5, the rotor control mechanism 32 includes a housing 33 having a pair of bores 34 and 35. The bore 35 has an annular sleeve 36 (see FIGURE 4) disposed therein. The sleeve 36 has an enlarged portion 37, which bears against a shoulder 38 in the housing 33. An annular retainer 39, which has an inner diameter slightly smaller than the inner diameter of the sleeve 36, is retained within the enlarged portion 37 of the sleeve 36 by a bushing 40, which is held against both the enlarged portion 37 and the retainer 39 by a cup member 41. The cup member 41 is secured to the housing 33 by suitable fastening means such as bolts 42 (one shown).

The sleeve 36 has a plurality of transverse bores extending therethrough to serve as fluid passages. The sleeve 36 has two bores 43 and 44 communicating with a bore 45, which is positioned in the housing 33 between the bores 34 and 35 and has its axis substantially parallel to the axes of bores 34 and 35. The bore 45 communicates with the bore 43 through an arcuate chamber 144 in the housing 33 (see FIGURES 4 and 12). As shown in FIGURES 4 and 13, a similar connection between the bore 45 and the bore 44 is provided by an arcuate chamber 145 in the housing 33.

Another transverse bore 46 in the sleeve 36 communicates with a passage or port 47, which extends to the exterior of the housing 33. An additional transverse bore 48 in the sleeve 36 communicates with a second passage or port 49 in the housing 33. The passage 49 extends to the exterior of the housing 33. The sleeve 36 has a fifth transverse bore 50 communicating with a transverse bore 51 in the housing 33. The passage or bore 51 connects with the bore 34 of the housing 33.

An annular sleeve 52, which has a bore of varying diameter extending axially therethrough, is disposed within the sleeve 36. The sleeve 52 is held within the housing 33 by biasing means such as a spring 53, which is positioned between the bushing 40 and a retaining washer 54 on the end of the sleeve 52. It should be observed that this end of the sleeve 52 and the spring 53 are disposed within the cup member 41. The inward movement of the sleeve 52 is limited by engagement of a shoulder 55 on the sleeve 52 with the end of the sleeve 36.

The sleeve 52 has a plurality of ports that cooperate with the transverse bores in the sleeve 36. Thus, the sleeve 52 has a port 56 cooperating with the bore 43, a port 57 cooperating with the bore 46, a port 58 cooperating with the bore 50, a port 59 cooperating with the bore 48, and a port 60 cooperating with the bore 44. The ports 56–60 are sized so that there is still communication between the ports 56–60 and the bores 43, 44, 46, 48, and 50 when the sleeve 52 moves relative to the sleeve 36. This increased size of the ports 56–60 of the sleeve 52 adjacent the bore of the sleeve 36 is readily evident from FIGURE 4.

The sleeve 52 has a chamber 61 formed between its outer surface and the inner surface of the sleeve 36. The chamber 61 communicates with a portion of the retainer 39 as the outer diameter of the sleeve 52 is reduced to form the chamber 61. The arrangement of the chamber 61 is such that there is a differential area of the sleeve 52 at this chamber 61 so that fluid supplied thereto moves the sleeve 52 exteriorly of the housing 33 against the force of the spring 53. The chamber 61 communicates with a transverse bore 62 in the cylindrical sleeve 36.

Figure 9:
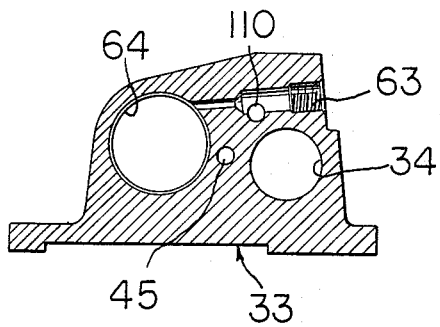
FIGURE 9 is a sectional view of the housing and taken along the line 9—9 of FIGURE 5.
Figure 10:
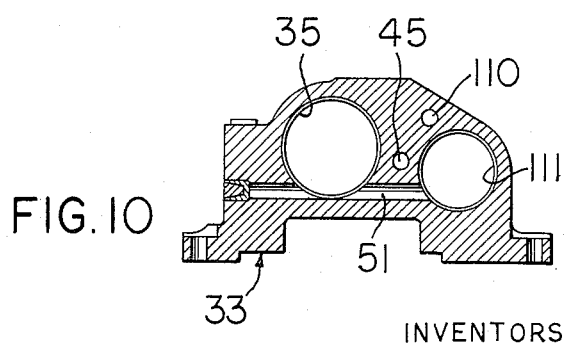
FIGURE 10 is a sectional view of the housing and taken along the line 10—10 of FIGURE 5.

The bore 62 is connected to a supply port 63 (see FIGURE 9) in the housing 33. The supply port 63 is connected to the control port 30 of the control means housing 19 whereby fluid may be supplied to the supply port 63 whenever the spool 12 and the valve 21 are disposed in the position shown in FIGURE 2. It should be observed that the bore 62 actually communicates with the supply port 63 through a chamber 64, which is formed by enlarging the diameter of the bore 35 of the housing 33. Thus, whenever fluid is supplied through the supply port 63 (see FIGURE 9), it will be readily noted that fluid is supplied to the chamber 61 through the chamber 64 and the bore 62. Due to the differential area of the sleeve 52 at the chamber 61, the sleeve 52 tends to move against the force of the spring 53 when fluid is supplied to the chamber 61.

A valve spool 65 is disposed within the bore of the sleeve 52 and has a plurality of lands thereon for cooperation with the ports 56–60 in the sleeve 52. The spool 65 has a land 66 at one end thereof for cooperation with the port 56 in the sleeve 52. A second land 67 on the spool 65 is spaced from the land 66 by a reduced shank portion 68. The land 67 is adapted to cooperate with the port 58 to connect the port 58 with either the port 57 or the port 59 in the sleeve 52. The spool 65 has a third land 69, which is spaced from the second land 67 by a reduced shank portion 70, adapted to cooperate with the port 60 in the sleeve 52.

One end of the spool 65 has a flange 73 for holding a head 71 of a rod 72 therein. The other end of the rod 72 has a retainer 74 secured thereto. A spacer 75 surrounds the rod 72 and has one end abutting against the spool 65. The other end of the spacer 75 engages a nut 76, which is disposed between the spacer 75 and the retainer 74. The retainer 74 is threaded on the rod 72 to contact the nut 76 and thereby form a fixed relationship between the spool 65, the spacer 75, the nut 76, and the retainer 74.

Biasing means, such as a spring 77, is disposed around a portion of the spacer 75. One end of the spring 77 abuts against the retainer 74 while the other end engages a portion of the sleeve 52. Thus, the spring 77 tends to urge the spool 65 to the right, as viewed in FIGURE 4. The inward movement of the spool 65 is limited by engagement of a flange 78 on the spool 65 with the shoulder 55 of the sleeve 52.

As shown in FIGURE 4, the diameter of the spacer 75 is smaller than the diameter of the spool 65 so that there is a differential area formed at this point. It should be further observed that this differential area occurs adjacent the chamber 61 so that the fluid, which is supplied through the supply port 63, is acting not only against the sleeve 52 but also against the spool 65 when it enters the chamber 61. Thus, the spool 65 tends to move outwardly from the housing 33 when the chamber 61 is supplied with fluid.

Figure 8:
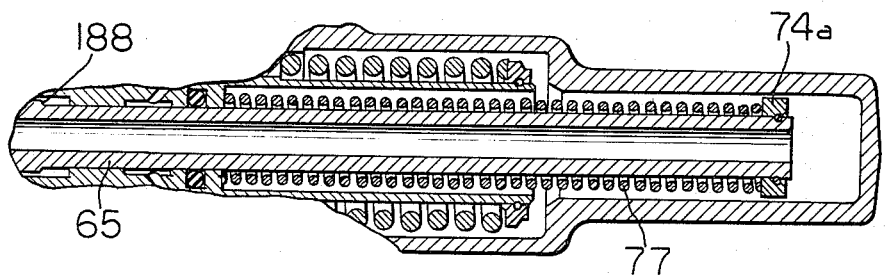
FIGURE 8 is a sectional view of a modification of a portion of the valve structure of FIGURE 4.

If desired, the rod 72, the nut 76, and the spacer 75 may be eliminated by extending the spool 65 rearwardly as shown in FIGURE 8. The spring 77 would then be disposed between the sleeve 52 and a retainer member 74a on the end of the spool 65. However, in order that the fluid in the chamber 61 may act on the spool 65, it is necessary that the spool 65 be reduced adjacent to the chamber 61 to provide a differential area 188.

Figure 15:
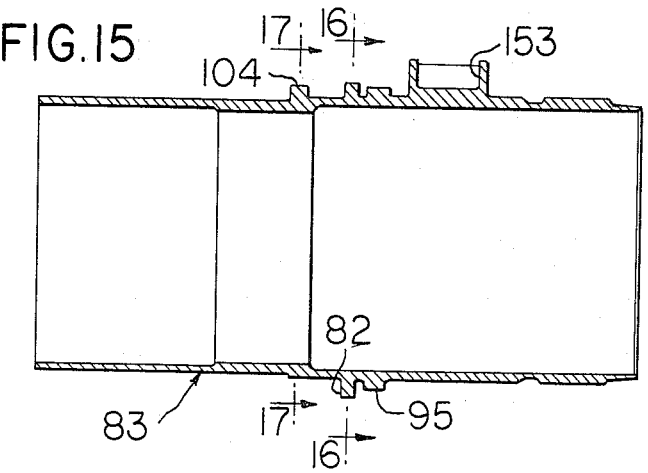
FIGURE 15 is a side elevational view of a portion of the rotor shaft that cooperates with the valve control of the present invention.

The spool 65 is moved outwardly against the force of the spring 77 by fluid being supplied to the chamber 61 to act against the differential area of the spool 65. The outward movement of the spool 65 is limited by a roller 79, which is mounted in a chamber 80 of the spool 65 by a pin 81, engaging a surface of a cam 82 on a portion of a rotor shaft 83 (see FIGURE 15). It should be understood that the shaft 83 is an extension of the rotor shaft, which connects a power plant of a helicopter 190 (see FIGURE 1A) to its blades 191 for propelling the helicopter 190. The rotor shaft 83 is connected through other shafts (not shown) to drive the blades 191. In the illustrated arrangement, the forward set of the blades 191 rotates in the opposite direction from the rear set and each is connected to a separate shaft, which is driven by the rotor shaft 83.

Figure 16:
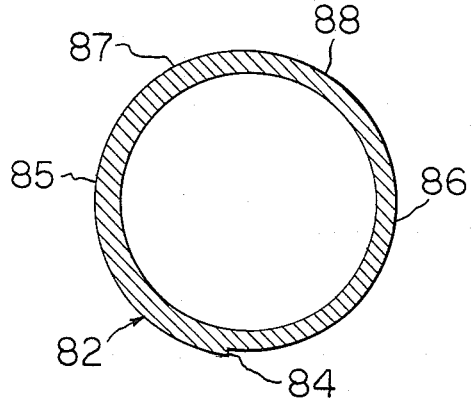
FIGURE 16 is a sectional view of the rotor shaft and taken along the line 16—16 of FIGURE 15.

A step portion 84 (see FIGURE 16) divides the cam 82 on the shaft 83 into portions 85 and 86 with the portion 85 having a greater radius than the portion 86. Since the two portions 85 and 86 are of different radii, there must be a blending from the radius of one portion to the other in a smooth curve. This occurs on the surface of the cam 82 between the points 87 and 88. Thus, the radius starts to reduce from the point 87 on the portion 82 whereas the radius starts to increase on the portion 86 from the point 88.

The position of the spool 65 with respect to the sleeve 52 depends upon the portion of the surface of the cam 82 that is engaged by the roller 79. If the roller 79 engages the portion 85 of the cam 82, the outward movement of the spool 65 from the housing 33 will be less than if the roller 79 engages the portion 86 of the cam 82.

When the roller 79 engages the portion 85 of the cam 82, the relative arrangement of the spool 65 and the sleeve 52 is shown in FIGURE 4. This also is the arrangement shown in FIGURE 2. As shown in FIGURE 4, the control passage 47 communicates with the bore 51 while the control passage 49 is connected with the bore 45 through the bore 44. If the roller 79 of the spool 65 abuts against the portion 86 of the cam 82, then the spool 65 is positioned with respect to the sleeve 52 so that the control passage 47 communicates with the bore 45 through the bore 43 while the control passage 49 communicates with the bore 51.

In order for the rotor shaft 83 to rotate properly, it is necessary that it be mounted in suitable bearings. These bearings allow a slight amount of transverse movement of the rotor shaft 83. This transverse movement would cause relative movement of the spool 65 to the sleeve 52 if suitable compensation means were not provided. Accordingly, a roller 89 is mounted on the end of the sleeve 52 by a pin 90 (see FIGURE 6).

The pin 90 is supported on the sleeve 52 by bearing portions 91 and 92, which are disposed in bores in the sleeve 52. The pin 90 has an eccentric portion 93 disposed between the bearing portions 91 and 92 and the roller 89 is mounted on the eccentric portion 93. The pin 90 is retained in the sleeve 52 by a spring pin 94.

The roller 89 cooperates with a circular surface 95 on the rotor shaft 83. Thus, whenever there is any transverse movement of the rotor shaft 83, there is equal movement of both the spool 65 and the sleeve 52 since both have engagement with the rotor shaft 83. The relative position of the spool 65 with respect to the sleeve 52 may be varied by rotating the eccentric portion 93 about its bearing portions 91 and 92. The position of the eccentric portion 93 with respect to the axis of its bearing portions 91 and 92 determines the position of the roller 89.

Thus, when the roller 89 is extended the maximum distance from the sleeve 52, it will create the maximum distance between the relative positions of the spool 65 and the sleeve 52. When the roller 89 is positioned at its maximum distance from the sleeve 52, the ports in the sleeve 52 are closed earlier by the lands on the spool 65 when the roller 79 engages the portion 85 of the cam 82. However, when the roller 79 engages the portion 86 of the cam 82, the ports in the sleeve 52 will not be closed as early by the lands on the spool 65. Of course, the opposite arrangement occurs when the roller 89 is in a minimum position of extension from the sleeve 52.

Figure 7:
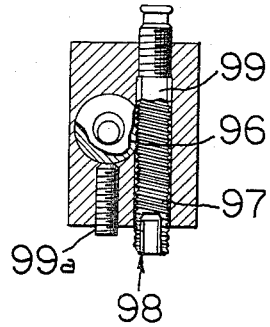
FIGURE 7 is a sectional view of an adjusting mechanism for part of the structure of FIGURE 6.

The eccentric portion 93 is rotated through a gear portion 96, which is an integral part of the pin 90, being driven by a cooperating gear portion 97 (see FIGURE 7) on an adjusting screw 98, which may be rotated by a screwdriver or the like from the exterior of the housing 33. The adjusting screw 98 has a flat portion 99 to limit the amount of rotation of the eccentric portion 93. The portion 99 cannot rotate the portion 93 since it has no threads like those forming the gear portion 97. The position of the portion 99 determines the amount of rotation of the eccentric portion 93 and is preferably designed so that the eccentric portion 93 will rotate a maximum of about 90 degrees. After the eccentric portion 93 has been adjusted to the desired position, a locking screw 99a is employed to maintain the roller 89 in the adjusted position by bearing against a portion of the pin 90 (see FIGURE 7). These adjustments are provided to insure that manufacturing tolerances can be tolerated without effecting the operation of the sleeve 65 and sleeve 52.

Figure 6:
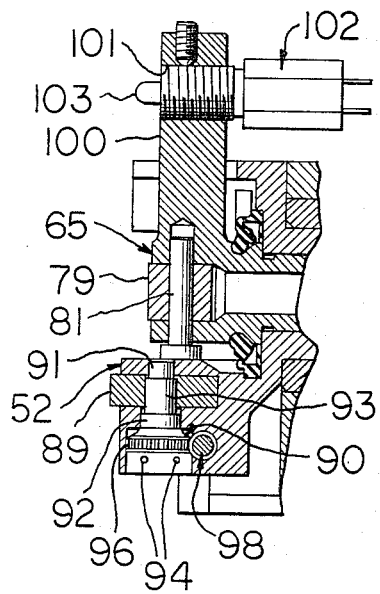
FIGURE 6 is a fragmentary sectional view of the end of the valve spool and the valve sleeve.
Figure 17:
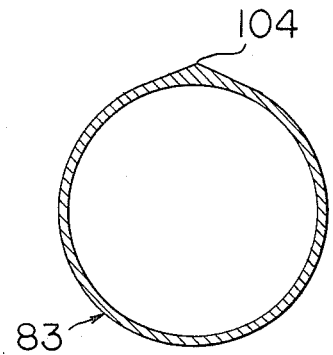
FIGURE 17 is a sectional view of the rotor shaft and taken along the line 17—17 of FIGURE 15.
Figure 18:
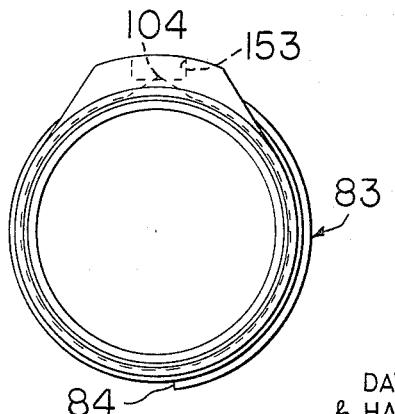
FIGURE 18 is an end view of the shaft of FIGURE 15.

As shown in FIGURE 6, the spool 65 has a flange 100 with a bore 101 extending therethrough for threadedly receiving a switch 102, which has a plunger 103 extending beyond the flange 100. The plunger 103 is actuated by a cam 104 (see FIGURE 17) on the rotor shaft 83. The engagement of the cam 104 with the plunger 103 occurs when the lands on the spool 65 have blocked the ports of the sleeve 52.

The actuation of the plunger 103 by the eccentric 104 causes the solenoid 16 to be deenergized and the solenoid 14 to be energized whereby the valve 21 and the spool 12 are moved to the position of FIGURE 3 from the position of FIGURE 2. The movement of the valve 21 by deenergization of the solenoid 16 results in the control port 30 being closed to the port 23 and connected with the return port 27 to stop supply of fluid to the rotor control mechanism. The movement of the spool 12, which is caused by energization of the solenoid 14, closes the port 29 from the supply port 23 and connects the supply port 22 with the port 28 to reverse the direction of fluid to the locking mechanism 31.

As shown in FIGURE 4, the bore 34 of the housing 33 has a guide support 105 disposed therein and held in abutting relationship with the end of the bore 34 by a floating piston and guide assembly 106. The assembly 106 is held in contact with the support 105 by a control valve sleeve 107, which is retained within the bore 34 by the cup member 41.

A chamber 108 is formed in the bore 34 of the housing 33 between the end of the bore and the assembly 106. As shown in FIGURE 11, the chamber 108 is connected by a passage 109 to a passage 110, which extends substantially the length of the housing 33 from the supply port 63 (see FIGURE 9) and has its axis substantially parallel to the axes of the bores 33 and 34. Thus, when fluid is supplied to the supply port 63, it flows through the passage 110 and the passage 109 to the chamber 108. Accordingly, whenever fluid is furnished to the supply port 63 of the rotor control mechanism 32, fluid is delivered simultaneously to the chamber 108.

The bore 34 of the housing 33 is enlarged at 111 to cooperate with a recess 112 in the assembly 106 to form a chamber 113. The chamber 113 communicates through the bore 51 with the bore 50 in the sleeve 36 and the port 58 in the sleeve 52. The chamber 113 also communicates with the chamber 108 through a passage 114 in the assembly 106 and ports 115 in a wall of the guide 105. The flow of fluid from the chamber 108 to the chamber 113 is controlled by a valve plunger 116 having its head 117 abutting against a seat 118 in the assembly 106.

The head 117 is held in engagement with the seat 118 by a guide 119, which is disposed within the interior of the guide support 105. The guide 119 is biased into engagement with the plunger head 117 by resilient means such as a spring 120. The other end of the spring 120 bears against an adjusting screw 121, which extends exteriorly of the housing 33 for adjustment by a screwdriver. Thus, the spring force acting on the plunger head 117 may be varied by adjusting the screw 121.

The other end of the plunger 116 is mounted within a central bore 122 of the assembly 106 and has a smaller diameter than the bore 122. A floating piston 123, which is essentially the same diameter as the bore 122, is positioned in the bore 122 adjacent the end of the plunger 116. The other end of the floating piston 123 is adjacent an end of a poppet valve 124.

The poppet valve 124 includes an annular portion 125, which slidingly fits within the central bore 122 and has a passage 126 extending therethrough. The passage 126 communicates with the exterior of the valve 124 at a reduced portion of the valve 124 through ports 127 in the reduced portion.

The poppet valve 124 terminates in a flange 128, which is disposed within a control piston 129 that is mounted within the interior of the sleeve 107. The control piston 129 is biased towards the assembly 106 by a pair of concentric springs 130 and 131 acting against a spring retainer 132, which is secured by a pin 133 to the control piston 129.

A spring 134 is disposed between the spring retainer 132 and the poppet valve 124 in concentric bores of the retainer 132 and the valve 124 to urge the poppet valve 124 into engagement with a seat 135, which is disposed at one end of the central bore 122 of the assembly 106, to close the bore 122. With the bore 122 closed by engagement of the poppet valve 124 against the seat 135, the bore 122 cannot communicate with a chamber 136, which is formed between an enlarged portion 137 of the bore 34 and a reduced portion 138 of the control valve sleeve 107. The chamber 136 also encompasses a space between the sleeve 107, the assembly 106, and the control piston 129. This space communicates with the space between the enlarged portion 137 and the reduced portion 138 through ports 139 in the wall of the sleeve 107. This space is formed by the engagement of the poppet valve 124 with the seat 135 preventing the control piston 129 from engaging the end of the assembly 106 because the spring 134 acts against the spring retainer 132, which is secured to the control piston 129.

As shown in FIGURE 13, the chamber 136 communicates with the passage 110 through a passage 140. Thus, fluid is supplied from the supply port 63 through the passage 110 and the passage 140 to the chamber 136. The passage 140 has a fluid regulating pin 141, which is connected to a screw 141' for adjustment thereof, therein to control the flow of fluid into the chamber 136.

When the fluid enters the chamber 136, it acts against the control piston 129 to move the piston 129 against the force of the springs 130 and 131. As fluid continues to enter the chamber 136, it continues to urge the control piston 129 away from the assembly 106 until a flange 142 on the control piston 129 engages the flange 128 of the poppet valve 124.

Engagement of the flange 142 of the control piston 129 with the flange 128 of the poppet valve 124 results in the poppet valve 124 moving against the force of the spring 134. This results in the poppet valve 124 moving away from the seat 135 to permit fluid flow from the chamber 136 through the ports 127 and the passage 126 to a small chamber 143, which is formed in the bore 122 between the floating piston 123 and the end of the poppet valve 124.

The pressure in the small chamber 143 is acting on a larger effective area, which is the floating piston 123, than the effective area of the head 117 of the valve plunger 116 against which the force of the spring 120 is acting. Thus, when fluid enters the small chamber 143, it moves the plunger head 117 away from the seat 118 to allow flow of fluid from the chamber 108 into the chamber 113.

The structure, which is disposed within the bore 34 of the housing 33, functions as a delay means for regulating flow of fluid through the bore 51. That is, when the fluid is supplied to the control mechanism 32 through the supply port 63 (see FIGURE 9), it first enters the chambers 64, 108, and 136. When it enters the chamber 64, the fluid applies pressure to the differential areas of the sleeve 52 and the spool 65 to move both the sleeve 52 and the spool 65 exteriorly of the housing 33 into engagement with the circular surface 95 and the cam 82, respectively, of the rotor shaft 83. Fluid does not enter the chamber 113 because of the delay mechanism until after the spool 65 has reached its final position as determined by engagement of the roller 79 with the cam 82. The amount of delay may be regulated by both the fluid regulating pin 141 in the passage 140 and adjustment of the force of the spring 120 through the adjusting screw 121. Of course, the force of the spring 120 also regulates the fluid pressure drop across the seat 118.

As previously explained, the bore 45 is connected to the bores 43 and 44 in the sleeve 36. The bore 45 functions as a return passage and is connected to a return port 146, which is connected to the reservoir 25, through a passage 147 (see FIGURE 14).

When the solenoid 16 is energized, the valve 21 is positioned so that fluid is supplied by the pump 24 to the supply port 63 of the control mechanism 32. This directs fluid to the chambers 64, 108, and 136. The fluid in the chamber 64 moves the sleeve 52 until it engages the circular surface 95 on the rotor shaft 83. The valve spool 65 continues to move until the roller 79 engages the cam 82. If the roller engages the portion 85 of the cam 82, the relationship of the spool 65 to the sleeves 36 and 52 is that shown in FIGURE 4.

In the arrangement of FIGURE 4, fluid flows from the chamber 108 to the chamber 113 after the spool 65 has reached its position of contact with the cam 82 due to the delay mechanism in the bore 34. The fluid flows from the chamber 113 through the bore 51, the bore 50, the port 58, the area around the reduced portion 68 of the spool 65, the port 57, the bore 46, and the control port 47 to a reversible hydraulic motor 148 (see FIGURES 1-3), which is connected through a gear box 149 and a clutch 150 to the rotor shaft 83. At the same time, the other outlet of the hydraulic motor 148 is connected to the return port 146 (see FIGURE 14) through the control port 49, the bore 48, the port 59, the area around the reduced shank portion 70 of the spool 65, the port 60, the bore 44, the arcuate chamber 145, the bore 45, and the passage 147 (see FIGURE 14). Thus, there is a complete cycle of fluid flow through the hydraulic motor 148 when the valve spool is in the position shown in FIGURE 4.

If the valve spool roller 79 engages the smaller portion 86 of the cam 82, the valve spool advances to the left, as viewed in FIGURE 4, to a second position beyond that of FIGURE 4. In this second position, the supply fluid from the port 58 passes around the shank portion 70 and then through the port 59, the bore 48, and the control 49 to the hydraulic motor 148. Thus, it is observed that the supply port 63 (see FIGURE 9) is now connected to the control port 49 whereas the supply port 63 was connected to the control port 47 when the roller 79 contacted the portion 85 of the cam 82. Thus, the motor 148 rotates in the opposite direction.

With fluid being supplied through the control port 49, it is seen that the control port 47 is connected through the bore 46, the port 57, the space around the reduced shank portion 68, the port 56, the bore 43, and the arcuate chamber 144 to the return bore 45, which connected to the return port 146 (see FIGURE 14) through the passage 147.

Whenever fluid is supplied to the control mechanism 32, it is noted that fluid is also supplied through a line 151 to the clutch 150. Thus, the clutch 150 is not engaged unless fluid is supplied through the line 151. This line 151 functions as a return drain line to the reservoir 25 whenever the valve 21 is in the position shown in FIGURES 1 and 3.

Whenever the rotor shaft 83 is driven by the hydraulic motor 148 to the predetermined position at which blade folding is to take place, it is desired that the rotor shaft 83 be locked in this position. Thus, the locking mechanism 31 includes a plunger 152, which is adapted to fit within a receptacle 153 formed on the exterior of the rotor shaft 83. The receptacle 153 is coincident with the cam 104 so that the plunger 152 becomes aligned with the receptacle 153 when the cam 104 engages the plunger 103 of the switch 102. As previously mentioned, the engagement of the plunger 103 by the cam 104 results in the solenoid 16 being deenergized and the solenoid 14 being energized whereby the valve 21 and the valve spool 12 move to the position shown in FIGURE 3. In this position fluid is supplied through the control port 28 to a port 154 (see FIGURE 20) of the locking mechanism 31 to move the plunger 152 into the receptacle 153 of the rotor shaft 83. At the same time, the control port 29, which communicates with the reservoir 25, is connected to a port 155 (see FIGURE 20) in the locking mechanism 31.

As shown in FIGURE 20, the ports 154 and 155 are disposed in an end member 156, which is secured by suitable fastening means such as a bolt 157 to a central member 158. The central member 158 is secured to a housing 159 of the lock mechanism 31 by suitable means such as a bolt 160, which passes through a bore 161 of the central member 158 and aligned bores (not shown) in the housing 159. The bolt 160 is held in fixed position by a nut (not shown), which draws the head of the bolt 160 against one side of the housing 159 while the nut engages against the opposite side of the housing 159.

The plunger 152 is mounted for sliding movement on a flange 162 of the central member 158. The plunger 152 cooperates with the flange 162 and the central member 158 to form a chamber 163 therebetween. The chamber 163 is connected to the port 154 through a passage 164 in the central member 158 and a passage 165 in the end member 156. It should be observed that the plunger 152 moves upon sliding plates 166 and 167 (see FIGURE 19) in the housing 159.

The plunger 152 has an end plate 168, which is disposed on the opposite side of the flange 162 of the central member 158 from the remainder of the plunger. The central member 158 has a small chamber 169, which is disposed adjacent the end plate 168. The chamber 169 is connected through a passage 170 in the central member 158 and a passage 171 in the end member 156 to the port 155.

Thus, when fluid is supplied to the chamber 163 through the port 154, it is removed from the chamber 169 through the port 155. Of course, the chamber 169 increases in size whenever the plunger 152 is withdrawn from the receptacle 153. The plunger 152 can be withdrawn from the receptacle 153 only by supplying fluid to the chamber 169 and removing it from the chamber 163. This occurs whenever the solenoid 15 is energized to move the valve spool 12 from the position of FIG-URE 3 to the position of FIGURE 1. In the position of FIGURE 1, the control port 29 is again connected to the pump 24 whereas the control port 28 again communicates with the reservoir 25.

As shown in FIGURE 21, the central member 158 has four sets of spaced arms 172 and 173 extending therefrom. A retainer 174 is secured to each of the sets of the spaced arms 172 and 173 by a pin 175. Each of the retainers 174 cooperates with a cylinder 176 (see FIGURE 22), which has an arcuate base and is disposed in an arcuate portion 177 of the plunger 152.

Resilient means such as a spring 178 surrounds portions of each of the retainers 174 and the cylinders 176 to urge the arcuate base of each of the cylinders 176 into engagement with the arcuate portion 177 of the plunger 152. Each of the springs 178 exert a force in a flange 179 of the retainer 174 and against the base of the cylinder 176.

When the plunger 152 is in the extended position of FIGURES 3 and 22, the springs 178 exert a force in a direction to maintain the plunger 152 in its extended position. Similarly, when the plunger 152 is retracted into the housing 159 (see FIGURE 20) by fluid being supplied to the chamber 169, it is seen that the force of the springs 178 will urge the plunger 152 to remain in its retracted position. Thus, the springs 178 function to maintain the plunger 152 in either of its positions.

When the solenoid 14 is energized by engagement of the cam 104 with the plunger 103, the plunger 152 is in its retracted position with the springs 178 urging it to remain in that position. However, the energization of the solenoid 14 moves the valve spool 12 to the position of FIGURE 3 wherein the pump 24 is connected through the control port 28 to the port 154. This supplies fluid through the passages 165 and 164 to the chamber 163 to move the plunger outwardly into engagement with the receptacle 153. At the same time, the chamber 169 is connected through the passages 170 and 171 and the port 155 to the control port 29, which is connected to the reservoir 25. Thus, the fluid, which was holding the plunger 152 in its retracted position, is removed from the chamber 169. As the plunger advances outwardly, the springs 178 are now positioned to exert a force to maintain the plunger 152 in the receptacle 153.

After the rotor blades 191 have reached their flight condition, the solenoid 15 is then energized to move the spool 12 from the position of FIGURE 3 to the position of FIGURE 1 wherein the pump 24 supplies fluid to the chamber 169 through the control port 29, the port 155, and the passages 170 and 171. This application of pressure to the chamber 169 withdraws the plunger 152 from the receptacle 153. At the same time, the chamber 163 is connected to the reservoir 25 through the passages 164 and 165, the port 154, and the control port 28 to remove fluid from the chamber 163.

Considering the operation of the present invention, it will be assumed that the spool 12 and the valve 21 are positioned in the housing 10 as shown in FIGURE 1. This is the position in which the rotor shaft 83 is free to rotate and drive the helicopter blades 191. Note that there is no flow of fluid to either the control mechanism 32 or the clutch 150 in this arrangement. However, there is flow of fluid to the chamber 169 of the lock mechanism 31 to maintain the plunger 152 in its retracted position.

If it is desired to now prepare the blades 191 for folding, it is necessary to rotate the rotor shaft 83 to the blade folding position, which has been predetermined. This is started by energizing the solenoid 16, which moves the valve 21 to the position shown in FIGURE 2. In this position, fluid is supplied to the clutch 150 and to the supply port 63 (see FIGURE 9) of the housing 33 of the control mechanism 32. The application of fluid to the supply port 63 of the housing 33 results in fluid being supplied to the chambers 64, 108, and 136. At the same time, the return port 146 (see FIGURE 14) of the housing 33 is directly connected to the reservoir 25 through a line 184, which bypasses the control housing 10.

The supply of fluid to the chamber 64 (see FIGURE 4) results in the valve sleeve 52 and the valve spool 65 being moved axially through the housing 33 toward the rotor shaft 83. The movement of the sleeve 52 (see FIGURE 4) is stopped by engagement of the roller 89 on the sleeve 52 engaging the surface 95 (see FIGURE 15) of the shaft 83. The valve spool 65 continues its outward movement until its roller 79 engages the cam 82 (see FIGURES 15 and 16) on the shaft 83. If the roller 79 engages the enlarged portion 85 of the cam 82, the spool 65 is stopped in substantially the position shown in FIGURES 2 and 4. In this position, the control port 47 (see FIGURE 4) is connected to the supply port 63 while the control port 49 (see FIGURE 4) is connected to the return port 146 (see FIGURE 14).

If the roller 79 of the spool 65 engages the reduced portion 86 of the cam 82, the valve spool 65 continues to progress axially in the same direction (to the left as viewed in FIGURE 4) but to a further degree. In this second position, which is when the roller 79 is contacting the portion 86 of the cam 82, the control port 47 is connected to the return port 146 while the control port 49 is connected to the supply port 63.

However, fluid flow from the supply port 63 to either the control port 47 or the control port 49 is delayed through the mechanism (see FIGURE 4), which is disposed in the bore 34 of the housing 33, until the spool 65 has reached either the first position, which is when the roller 79 is engaging the portion 85 of the cam 82, or the second position, which is when the roller 79 is engaging the portion 86 of the cam 82. After the valve spool 65 is in either its first or second position and has ceased to move, the delay mechanism permits the fluid to flow from the chamber 108 to the chamber 113 and thence to the bore 51 from which it is supplied through the bore 50 and the port 58 to either the control port 47 or the control port 49.

The direction of rotation of the motor 148 depends upon which of the control ports 47 or 49 is supplied with fluid. Of course, the other of the control ports 47, 49 is connected to the reservoir 25. The hydraulic motor 148 has a case drain 185, which permits drainage of the motor. The drain 185 also is connected to the reservoir 25.

When the motor 148 has rotated the rotor shaft 83 to the predetermined position wherein the rotor shaft 83 is at its blade folding position, the cam 104 (see FIGURES 15 and 17) on the shaft 83 engages the plunger 103 of the switch 102 (see FIGURE 6) to deenergize the solenoid 16 and energize the solenoid 14. The energization of the solenoid 14 results in the valve spool 12 moving in the control housing 10 to the position shown in FIGURE 3. In this position, hydraulic fluid is supplied by the pump 24 through the control port 28 to the chamber 163 (see FIGURE 20) to move the plunger 152 into the receptacle 153 (see FIGURES 1 and 2) of the rotor shaft 83. This locks the rotor shaft 83 to prevent any further movement.

Accordingly, when the blades 191 are again in their flight condition, it is only necessary to energize the solenoid 15. This results in the valve spool 12 moving in the housing 10 to the position of FIGURE 1 wherein fluid is supplied from the pump 24 through the control port 29 to the chamber 169 (see FIGURE 20). This results in the plunger 152 being retracted from the receptacle 153 of the shaft 83 into the housing 159. As soon as the plunger 152 is completely removed from the receptacle 153, the rotor shaft 83 is ready for driving the blades 191 to propel the helicopter 190. Of course, suitable protection (not shown) is employed to prevent energization of the solenoid 16 until the rotor shaft 83 is not being driven by the engine to propel the helicopter 190.

Although the rotor shaft 83 has been shown in conjunction with a tandem rotor helicopter, it should be understood that the rotor shaft 83 may drive the blades of a single rotor helicopter or the blades of a coaxial rotor helicopter. As previously explained, if the rotor shaft 83 is driving more than one set of blades, the rotor shaft 83 is actually connected to two other shafts, which drive each of the sets of blades.

While the invention has been described with respect to a rotor shaft for a helicopter, it will be understood that this valve control is useful wherever it is desired to determine the position of a movable member with respect to a predetermined position and move the member in a predetermined direction.

An advantage of this invention is that it allows a rotor shaft of a helicopter to be moved more rapidly to its blade folding position. Another advantage of this invention is that it ensures that the rotor shaft remains in its blade folding position until the blades return to their flight position. A further advantage of this invention is that only a single hydraulic system is required for determining the desired direction of rotation of the shaft, supplying the driving fluid, and locking the rotor shaft in its blade folding position. Still another advantage of this invention is that the movement of the valve spool in the same axial direction to move the rotor shaft in either direction provides a more positive selection by eliminating reversal of the valve spool. A still further advantage of this invention is that it employs a single hydraulic system for determining the location of a movable member with respect to a predetermined position, selecting the predetermined direction of motion of the movable member to reach its predetermined position, supplying the driving fluid for moving the movable member to its predetermined position, and automatically locking the movable member in its predetermined position when it reaches the predetermined position.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A hydraulic mechanism for moving a member to a predetermined position in a predetermined direction, said mechanism including a valve spool movable into engagement with the member when fluid is applied to the spool, said valve spool moving to a first position when the member is in a first predetermined area with respect to its predetermined position and to a second position when the member is in a second predetermined area with respect to its predetermined position, the predetermined areas being disposed on opposite sides of the predetermined position and including the entire area of movement of the member, and means adapted to move the member to its predetermined position, said valve spool controlling the direction of fluid flow to said means for moving the member whereby the direction of movement of the member is determined, said valve spool permitting fluid flow in one direction when in its first position whereby the member is moved in one direction and permitting fluid flow in a second direction when in its second position whereby the member is moved in the opposite direction.

2. A hydraulic mechanism for moving a rotatable member to a predetermined position in a predetermined direction, said mechanism including a valve spool movable into engagement with the rotatable member when fluid is applied to the spool, said valve spool moving to a first position when the rotatable member is in a first predetermined area with respect to its predetermined position and to a second position when the rotatable member is in a second predetermined area with respect to its predetermined position, the predetermined areas being disposed on opposite sides of the predetermined position and including the entire area of rotation of the rotatable member, means adapted to rotate the rotatable member, said valve spool controlling the direction of fluid flow to said means for rotating the rotatable member whereby the direction of rotation of the rotatable member is determined, said valve spool permitting fluid flow in one direction when in its first position whereby the rotatable member is rotated in one direction and permitting fluid flow in a second direction when in its second position whereby the rotatable member is rotated in the opposite direction.

3. A hydraulic control for moving a rotatable member to a predetermined position in a predetermined direction, said control including a housing, a control member movable axially in said housing, means to apply hydraulic fluid to said control member to move it axially in one direction in said housing, said control member being movable axially in said housing to a first position when the rotatable member is in a first predetermined area, said control member being movable axially in the housing in the same direction to a second position when the rotatable member is in a second predetermined area, and a reversible motor to drive the rotatable member to its predetermined position, said control member controlling fluid flow to said motor whereby the fluid is supplied to said motor to drive it in a first direction when the control member is in its first position and to drive it in a reverse direction when the control member is in its second position.

4. A hydraulic control for moving a rotatable member to a predetermined position in a predetermined direction, said control including a housing, a control member movable axially in said housing, means to apply hydraulic fluid to said control member to move it axially in one direction in said housing, said control member being movable axially in said housing to a first position when the rotatable member is in a first predetermined area, said control member being movable axially in the housing in the same direction to a second position when the rotatable member is in a second predetermined area, a reversible motor adapted to drive the rotatable member to its predetermined position, said control member controlling fluid flow to said motor whereby the fluid is supplied to said motor to drive it in a first direction when the control member is in its first position and to drive it in a reverse direction when the control member is in its second position, and said housing having means to delay fluid flow to said motor until said control member stops its axial movement by engagement with the rotatable member.

5. A hydraulic mechanism adapted to control the movement of a member to a predetermined position in a predetermined direction, said mechanism including a housing having a fluid supply port, a fluid return port, and a pair of control ports adapted to be connected to a motor or the like for moving the member to its predetermined position, control means axially movable in said housing, and means to supply fluid to said supply port to move said control means axially in one direction through said housing to a first position or a second position in accordance with the position of the member with respect to its predetermined position, said control means permitting fluid flow from said supply port to one of said control ports and from the other of said control ports to said return port when in its first position whereby the motor moves the member in one direction to its predetermined position and said control means permitting fluid flow from said supply port to said other control port and from said one control port to said return port in its second position whereby the motor moves the member in the opposite direction to its predetermined position.

6. A hydraulic mechanism adapted to control the movement of a member to a predetermined position in a predetermined direction, said mechanism including a housing having a fluid supply port, a fluid return port, and a pair of control ports adapted to be connected to a motor or the like for moving the member to its predetermined position, control means axially movable in said housing, means urging the control means to move axially through said housing in a first direction when there is no fluid supply to said supply port, means to supply fluid to said supply port to move said control means axially in a second direction through said housing to a first position or a second position in accordance with the position of the member with respect to its predetermined position, said control means permitting fluid flow from said supply port to one of said control ports and from the other of said control ports to said return port when in its first position whereby the motor moves the member in one direction to its predetermined position and said control means permitting fluid flow from said supply port to said other control port and from said one control port to said return port in its second position whereby the motor moves the member in the opposite direction to its predetermined position.

7. A hydraulic mechanism adapted to control the movement of a member to a predetermined position in a predetermined direction, said mechanism including a housing having a fluid supply port, a fluid return port, and a pair of control ports adapted to be connected to a motor or the like for moving the member to its predetermined position, control means axially movable in said housing, means to supply fluid to said supply port to move said control means axially in one direction through said housing to a first position or a second position in accordance with the position of the member with respect to its predetermined position, said control means permitting fluid flow from said supply port to one of said control ports and from the other of said control ports to said return port when in its first position whereby the motor moves the member in one direction to its predetermined position and said control means permitting fluid flow from said supply port to said other control port and from said one control port to said return port in its second position whereby the motor moves the member in the opposite direction to its predetermined position, and said housing having means to delay the flow of fluid from said supply port to said control port until said control means has completed its axial movement to its first position or its second position.

8. A hydraulic mechanism adapted to control the movement of a member to a predetermined position in a predetermined direction, said mechanism including a housing having a fluid supply port, a fluid return port, and a pair of control ports adapted to be connected to a motor or the like for moving the member to its predetermined position, control means axially movable in said housing, means to supply fluid to said supply port to move said control means axially in one direction through said housing to a first position or a second position in accordance with the position of the member with respect to its predetermined position, said control means permitting fluid flow from said supply port to one of said control ports and from the other of said control ports to said return port when in its first position whereby the motor moves the member in one direction to its predetermined position and said control means permitting fluid flow from said supply port to said other control port and from said one control port to said return port in its second position whereby the motor moves the member in the opposite direction to its predetermined position, said housing having means to delay the flow of fluid from said supply port to said control port until said control means has completed its axial movement to its first position or its second position, said delay means including a first chamber in said housing connected to said supply port, a second chamber in said housing connected to said supply port, a third chamber in said housing and communicating with one of said control ports when said control means is in its first position or its second position, said housing having a passage connecting said first chamber with said third chamber, and valve means to control fluid flow through said passage, said valve means moving to a closed position when said supply means supplies fluid to said supply port, said second chamber having regulating means for coacting with said valve means to move said valve means from its closed position to an open position, said regulating means being allowed to move said valve means to an open position a predetermined time period after said supply means supplies fluid to said supply port.

9. A hydraulic mechanism according to claim 8 including resilient means to maintain the valve means in its closed position.

10. A valve mechanism according to claim 9 including means to vary the bias of said resilient means to vary the predetermined time period.

11. A hydraulic control for moving a member to a predetermined position in a predetermined direction, said control including a housing, a valve spool in said housing, a valve sleeve surrounding said spool, said sleeve having a plurality of ports therein, said spool having a plurality of lands for cooperation with said ports, means to supply fluid to one of said ports, two of said ports being adapted to be connected to a motor or the like for moving the member in either of two directions to its predetermined position and functioning as control ports, two of said other ports functioning as return ports, means urging said sleeve in a first direction into engagement with said housing, means urging said spool in the first direction into engagement with a portion of said sleeve, means to apply fluid from said supply port to said sleeve and said spool to overcome said urging means to move said sleeve and said spool in a second direction relative to said housing and to move said spool in the second direction relative to said sleeve, said spool and said sleeve being limited in movement in the second direction by engagement with the member to be moved by the motor, said spool reaching a first position with respect to said sleeve when the member is in a first predetermined area with respect to its predetermined position and a second position with respect to said sleeve when the member is in a second predetermined area with respect to its predetermined position, said lands being positioned to allow said supply port to communicate with one of said control ports and one of said return ports to communicate with the other of said control ports when said spool is in its first position whereby the fluid flow to the motor causes the motor to move the member in one direction to its predetermined position, and said lands being poistioned to allow said supply port to communicate with said other control port and the other of said return ports to communicate with said one control port when said spool is in its second position whereby the fluid flow to the motor causes the motor to move the member in the opposite direction to its predetermined position.

12. A hydraulic control for moving a rotatable member to a predetermined position in a predetermined direction, said control including a housing, a valve spool in said housing, a valve sleeve surrounding said spool, said sleeve having a plurality of ports therein, said spool having a plurality of lands for cooperation with said ports, means to supply fluid to one of said ports, two of said ports being adapted to be connected to a motor or the like for moving the member to its predetermined position and functioning as control ports, two of said other ports functioning as return ports, means urging said sleeve in a first direction into engagement with said housing, means urging said spool in the first direction into engagement with a portion of said sleeve, means to apply fluid from said supply port to said sleeve and said spool to overcome said urging means to move said sleeve and said spool in a second direction relative to said housing and to move said spool in the second direction relative to said sleeve, said spool and said sleeve being limited in movement in the second direction by engagement with the rotatable member to be moved by the motor, said spool reaching a first position with respect to said sleeve when the rotatable member is in a first predetermined area with respect to its predetermined position and a second position with respect to said sleeve when the rotatable member is in a second predetermined area with respect to its predetermined position, said lands being positioned to allow said supply port to communicate with one of said control ports and one of said return ports to communicate with the other of said control ports when said spool is in its first poistion whereby the fluid flow to the motor causes the motor to move the rotatable member in one direction to its predetermined position, said lands being positioned to allow said supply port to communicate with said other control port and the other of said return ports to communicate with said one control port when said spool is in its second position whereby the fluid flow to the motor causes the motor to move the rotatable member in the opposite direction to its predetermined position, and means to maintain the sleeve and the spool in their relative positions to each other whenever the rotatable member moves transversely.

13. A hydraulic control according to claim 12 including means to adjust the relative positions of the sleeve and the spool with respect to each other.

14. In combination, a rotatable shaft for driving rotor blades of a helicopter, means for rotating the shaft to a predetermined position, a housing, a valve spool disposed in said housing and movable axially therein, control means to apply fluid to said spool to move it axially through said housing in one direction, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said spool controlling the direction of fluid flow to said rotating means whereby the rotating means drives the shaft in one direction when the valve spool is in its first position and in the opposite direction when the valve spool is in its second position.

15. In combination, a rotatable shaft for driving rotor blades of a helicopter, means for rotating the shaft to a predetermined position, a housing, a valve spool disposed in said housing and movable axially therein, control means to apply fluid to said spool to move it axially through said housing in one direction, means urging the valve spool to move axially through the housing in the opposite direction, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said spool controlling the direction of fluid flow to said rotating means whereby the rotating means drives the shaft in one direction when the valve spool is in its first position and in the opposite direction when the valve spool is in its second position, and means on said rotatable shaft adapted to actuate said control means when said rotatable shaft reaches its predetermined position to stop application of fluid to said valve spool whereby said valve spool is moved axially through said housing away from its first position or its second position by said urging means.

16. In combination, a rotatable shaft for driving rotor blades of a helicopter, means for rotating the shaft to a predetermined position, a housing, a valve spool disposed in said housing and movable axially therein, control means to apply fluid to said spool to move it axially through said housing in one direction, means urging the valve spool to move axially through the housing in the opposite direction, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said spool controlling the direction of fluid flow to said rotating means whereby the rotating means drives the shaft in one direction when the valve spool is in its first position and in the opposite direction when the valve spool is in its second position, means on said rotatable shaft adapted to actuate said control means when said rotatable shaft reaches its predetermined position to stop application of fluid to said valve spool whereby said valve spool is moved axially through said housing away from its first position or its second position by said urging means, and means to lock said rotatable shaft in its predetermined position.

17. The combination according to claim 16 in which said lock means includes a locking housing, plunger means movable from said locking housing to be disposed in a recess in said rotatable shaft, said control means applying fluid to said plunger means to move it from its unlocked position to its locking position and vice versa, said plunger means being moved to its locking position when said control means stops application of fluid to said valve spool after said rotatable shaft is in its predetermined position, and means to aid the fluid in holding the plunger means in both of its positions.

18. In combination, a rotatable shaft for driving rotor blades of a helicopter, means for rotating the shaft to a predetermined position, a housing, a valve spool disposed in said housing and movable axially therein, control means to apply fluid to said spool to move it axially through said housing in one direction, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said spool controlling the direction of fluid flow to said rotating means whereby the rotating means drives the shaft in one direction when the valve spool is in its first position and in the opposite direction when the valve spool is in its second position, and said housing having means to delay fluid flow to said rotating means until after said valve spool abuts against said cam on said rotatable shaft.

19. The combination according to claim 18 including means in said housing to vary the period that the fluid flow to the rotating means is delayed.

20. In combination, a rotatable shaft for driving the rotor blades of a helicopter, a reversible hydraulic motor for rotating the shaft to a predetermined position, a clutch connecting the motor to the shaft, a housing, a valve spool disposed in said housing and movable axially therein, control means to apply fluid to said spool to move it axially through said housing in one direction, said control means applying fluid to said clutch when fluid is applied to said spool to connect the motor to the shaft, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said valve spool controlling direction of fluid flow to said motor whereby the motor is driven in one direction when the valve spool is in its first position and in the opposite direction when the valve spool is in its second position.

21. In combination, a rotatable shaft for driving the rotor blades of a helicopter, means for rotating the shaft to a predetermined position, a housing, a valve spool disposed in said housing and movable axially therein, control means to apply fluid to said spool to move it axially through said housing in one direction, means urging the valve spool to move axially through the housing in the opposite direction, said rotatable shaft having a cam thereon, said spool abutting against said cam when fluid is applied to said spool by said control means, said spool being stopped in its axial movement in a first position when abutting against a first portion of said cam, said spool progressing past its first position to a second position when said spool abuts against a second portion of said cam, said spool controlling the direction of fluid flow to said rotating means whereby the rotating means drives the shaft in one direction when the valve spool is in its first position and in the opposite direction when the valve spool is in its second position, means on said rotatable shaft adapted to actuate said control means when said rotatable shaft reaches its predetermined position to stop application of fluid to said valve spool whereby said valve spool is moved axially through said housing away from its first position or its second position by said urging means, and means to lock said rotatable shaft in its predetermined position, said lock means being moved to its locking position by said control means after said control means is actuated by said means on said rotatable shaft.

References Cited by the Examiner
UNITED STATES PATENTS

| | | | |
|---|---|---|---|
| 860,461 | 7/1907 | Germiner | 91—340 |
| 2,821,172 | 1/1958 | Randall | 91—43 |
| 2,938,501 | 5/1960 | Titcomb | 91—43 |

SAMUEL LEVINE, *Primary Examiner.*

FRED E. ENGELTHALER, *Examiner.*